United States Patent [19] [11] Patent Number: 4,788,940
Förster [45] Date of Patent: Dec. 6, 1988

[54] MECHANISM FOR FEEDING ANIMALS WITH LIQUID FEED

[76] Inventor: Martin Förster, Gerwigstrasse 27, D7707 Engen, Fed. Rep. of Germany

[21] Appl. No.: 42,301

[22] Filed: Apr. 24, 1987

[30] Foreign Application Priority Data

Apr. 24, 1986 [DE] Fed. Rep. of Germany ....... 3613887

[51] Int. Cl.⁴ ............................................. A01K 9/00
[52] U.S. Cl. ................................................. 119/71
[58] Field of Search .................... 119/71, 51.5; 604/76, 604/77, 79

[56] References Cited

U.S. PATENT DOCUMENTS 3,285,226 11/1966 Schuler ............................. 119/71 X
3,307,521 3/1967 Tavera et al. ....................... 119/71
3,874,342 4/1975 Kloss .................................... 119/71

FOREIGN PATENT DOCUMENTS 299584 8/1965 Netherlands ......................... 119/71

Primary Examiner—Robert P. Swiatek
Attorney, Agent, or Firm—Becker and Becker, Inc.

[57] ABSTRACT

A mechanism for feeding animals with liquid feed that can be withdrawn from a supply unit, such as an automatic soaking unit, and can be supplied to a suction unit via a conduit. A feed pump is placed in the conduit, with the conveying capacity of the feed pump being regulatable as a function of vacuum in the conduit.

11 Claims, 1 Drawing Sheet

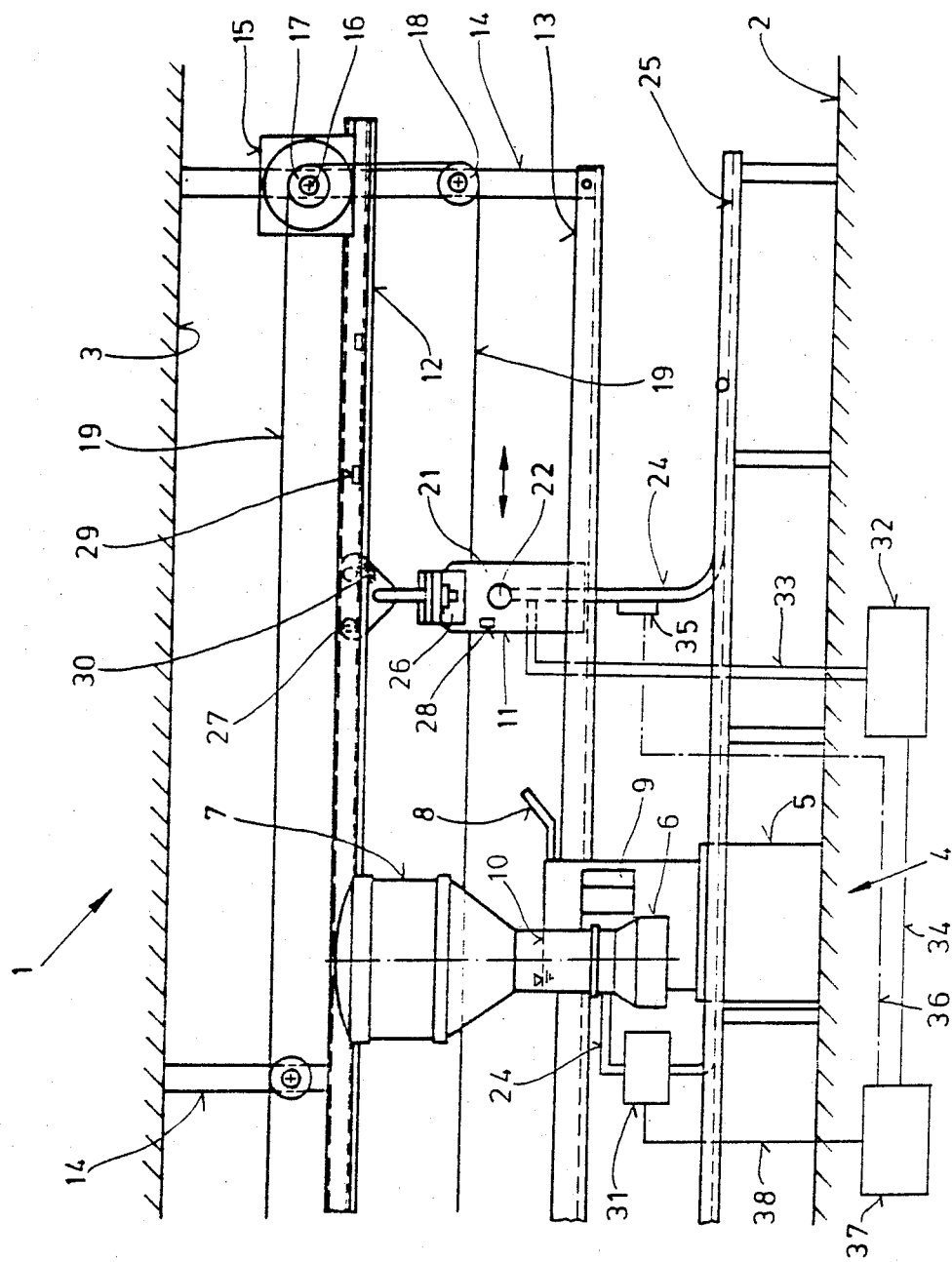

MECHANISM FOR FEEDING ANIMALS WITH LIQUID FEED

BACKGROUND OF THE INVENTION

The present invention relates to a mechanism for feeding calves, cattle, or similar domesticated animals, especially young animals, with liquid feed that can be withdrawn from a supply unit, especially an automatic wetting or soaking unit, and can be supplied to a suction unit via a conduit or the like.

With mechanisms of this general type, such as disclosed in U.S. Pat. No. 4,550,685, Forster dated Nov. 5, 1985, which belongs to the inventor of the present application, the suction lines, which are required between a central supply unit or an automatic soaking unit and the suction units, are often long, so that the animals, in order to draw off the feed, must suck very hard in order to overcome the resistance to flow. In doing so, especially young animals sometimes become tired already after a short period of time. Thus, these animals often don't get enough to eat, which adversely affects their growth. Furthermore, it is difficult to clean the conduits because they have to be removed from the suction unit in order to be able to empty them and rinse them with a cleaning material.

It is therefore an object of the present invention to improve a mechanism of the aforementioned general type in such a way that the resistance to flow of a conduit, which connects the suction unit, for example, with an automatic soaking unit, can nearly be compensated for independently of the length of the conduit, so that animals have only to suck slightly and uniformly in order to draw off feed. Thus, it is easier for the animals to withdraw feed. Furthermore, handling during cleaning of the suction lines and when putting the mechanism into operation should be simplified.

BRIEF DESCRIPTION OF THE DRAWING

These objects, and other objects and advantages of the present invention, will appear more clearly from the following specification in conjunction with the accompanying schematic drawing, which illustrates one exemplary embodiment of the inventive feed mechanism.

SUMMARY OF THE INVENTION

The mechanism of the present invention is characterized primarily in that a feed pump for the feed is placed in the suction line; the conveying capacity of the feed pump can be regulated as a function of the vacuum that prevails in the suction line.

To effect this regulation of the feed pump in a straightforward manner, a sensor can be provided that is affected by or senses a vacuum. The sensor can be placed in the suction line or can be connected thereto, and in order to evaluate the control signals is connected to a control unit that in turn is associated with the feed pump.

Pursuant to one specific embodiment of the present invention, the sensor can be in the form of a vacuum switch, with the feed pump being turned on and off as a function of the control signals of this switch. In such a case, with the aid of the control unit, the feed pump should be cyclically operable at the beginning of a feeding operation, and should be regulatable in such a way that the conveying volume of the pump is variable in selectable stages during an adjustable period of time.

It is furthermore expedient to connect the vacuum switch to the conduit near the suction unit. The vacuum switch should advantageously be connected to the conduit in a region that extends above the upper liquid level of the supply unit. Where the latter is an automatic soaking unit, the vacuum switch should be connected to the conduit in a region that extends above the upper liquid level of the mixer of the soaking unit.

Pursuant to another specific embodiment of the present invention, the sensor can be in the form of a measured-value indicator, the control signals of which are proportional to the vacuum in the conduit at any given time. The conveying volume of the feed pump can be infinitely varied, for example by regulating the speed, as a function of the control signals given off by the measured-value indicator.

As a result of the feed pump, which is inventively placed in the conduit, with its conveying capacity being regulatable as a function of the vacuum that prevails in this conduit, it is possible to compensate for the resistance to flow of a conduit, so that the animals at the suction unit have only to apply a low and nearly constantly uniform suction. Thus, with the inventive mechanism, long conduits can be used; consequently, the supply unit, or the automatic soaking unit for preparing the feed, can be placed at any favorable location without regard to the location of the suction unit. Furthermore, the animals can receive a large quantity of fed in a short period of time without getting tired. As a result, the capacity of the inventive mechanism is optimally utilized, since the animals can now obtain feed at a suction unit more quickly than was previously possible, so that a single inventive mechanism can effectively feed a far greater number of animals than was previously possible.

A further advantage is that the feed pump can be installed into existing equipment without difficulty, so that existing equipment can be retrofitted. In addition, handling of the inventive mechanism is considerably facilitated since, by means of the feed pump, a conduit can be easily emptied and rinsed with a cleaner without having to remove the conduit from the suction unit, with this being especially advantageous for pumping warm feed into the conduit prior to putting the mechanism into operation.

Further specific features of the present invention will be described in detail subsequently.

DESCRIPTION OF PREFERRED EMBODIMENTS

Referring now to the drawing in detail, the apparatus 1 serves to feed a large number of animals, especially young animals, with liquid feed in a controlled manner. The feed mechanism 1 essentially comprises a stationary automatic wetting or soaking unit 4, and a suction unit 11 that is adjustably disposed to the side of the soaking unit 4. The feed, which comprises dry powder supplied from a supply tank 7 and water that flows in via a line 8, is prepared in a mixer 6 that is held on a housing 5 on the bottom 2 of the stall, stable, etc. This feed is available to the animals at the suction unit 11.

In the illustrated embodiment, the movable suction unit 11 is formed by a plate 21 and a nipple 22 that is inserted in the plate. The nipple 22 is connected to the mixer 6 via a flexible conduit 24 that rests on a trough-shaped support 25 disposed below the lower liquid level of the mixer 6. The plate 21 is movably supported in a lower guide rail 13 that is U-shaped and is suspended on the ceiling 3 of the stall, stable, etc. via support rods 14. In order to keep the frictional forces that have to be overcome low, the plate 21 is supported via a fork-shaped piece 26 and rollers 27 that are mounted on the piece 26 and ride on the upper guide rail 12. The suction unit 11 is driven by a rotating draw cable 19 that is guided over rollers 18 and is driven by a motor 15; a drive pulley 17 is disposed on the output shaft 16 of the motor 15. If the motor 15 is embodied as a servomotor, and if control marks 29 are provided, for example on the upper guide rail 12, the suction unit 11, which is provided with a proximity switch 30, can be moved in stages. Furthermore, an identification unit 28 can be provided on the plate 21; by means of this unit, a specific quantity of feed can be supplied to the individual animals, which are provided with an identification mark, in cooperation with a programmed control mechanism 9 that is associated with the automatic soaking unit 4.

Since the conduit 24 that connects the suction unit 11 to the mixer 6 of the soaking unit 4 must be long or large, a feed pump 31, such as a variable cell-type pump, is inserted in the conduit 24. Thus, the suction capacity that the animals have to apply at the suction unit 11 is kept as low as possible, so that even young animals can be continuously fed a sufficient quantity of feed without becoming tired during the process.

To set the conveying capacity of the pump 31, and to be able to conform to requirements at any given time, a sensor 32 in the form of a vacuum switch is connected via a line 33 in the suction line 24, near the suction unit 11, in a region disposed above the upper liquid level 10 of the mixer 6. The control signals of the sensor 32 can be conveyed via a signal line 34 to a control unit 37, which is connected to the feed pump 31 via a control line 38.

Consequently, when a vacuum occurs in the conduit 24, the feed pump 31 is switched on for a certain period of time or as long as the signal generated as a function of the vacuum is emitted. Thus, with the aid of the feed pump 31, the feed is supplied to an animal that is receiving feed at the suction unit 11; the suction capacity required of the animal is consequently low. To prevent too great of a quantity of feed being available to the animals at the beginning of a feeding process, the feed pump 31 can be driven cyclically with the aid of the control unit 37. For example during a time span of two seconds, the conveying volume of the feed pump 31 can be increased in stages up to full capacity by controlling the pump in such a way that during the first or initial second of time only a third of the possible capacity is pumped to the suction unit 11, and in the second or following second of time two thirds of the capacity is pumped to the suction unit 11. Only at the start of the third or subsequent second of time is the full capacity produced, at least as long as feed is taken from the hose or conduit 24 and a vacuum consequently prevails in said conduit.

However, it is also possible to vary in stages the quantity being conveyed by the pump 31 as a function of the vacuum prevailing in the suction line 24. As indicated by a dot-dash line, this can be accomplished with the aid of a sensor 35 in the form of a measured-value indicator. The sensor 35 is placed in the conduit 24, and is connected to the control unit 37 via a signal line 36. Thus, as a function of the received signals, and with the aid of the control unit 37, it is possible to undertake, for example, a regulation of the speed of the feed pump 31 in order to immediately adapt the conveying capacity of the pump to the quantity of feed that is withdrawn at any given time from the suction unit 11, and that is proportional to the vacuum in the suction line 24.

The present invention is, of course, in no way restricted to the specific disclosure of the specification and drawing, but also encompasses any modifications within the scope of the appended claims.

What I claim is:

1. A mechanism for feeding animals with liquid feed that can be withdrawn from a supply unit and can be supplied to a suction unit via a conduit, with said mechanism further comprising:
   a feed pump disposed in said conduit for conveying a variable volume of said feed; and
   means for regulating the conveying capacity of said feed pump so that conveyed volume of said liquid feed is controlled and variable as dependent upon and as a function of any vacuum prevailing in said conduit.

2. A mechanism for feeding animals with liquid feed that can be withdrawn from a supply unit and can be supplied to a suction unit via a conduit, with said mechanism further comprising:
   a feed pump disposed in said conduit for said feed; and
   means for regulating the conveying capacity of said feed pump as a function of any vacuum prevailing in said conduit, said means for regulating said feed pump comprises: a sensor associated with said conduit for sensing any vacuum in the latter and for emitting control signals in conformity therewith; and a control unit that is connected to said sensor for evaluating control signals therefrom, with said control unit also being connected to said feed pump to effect regulation thereof.

3. A mechanism according to claim 2, in which said sensor is placed in said conduit.

4. A mechanism according to claim 2, in which said sensor is connected to said conduit.

5. A mechanism according to claim 2, in which said sensor is a vacuum switch, with said feed pump being adapted to be turned on and off as a function of the control signals of said vacuum switch.

6. A mechanism according to claim 5, in which said control unit regulates said feed pump by operating same cyclically at the start of a feeding operation and furthermore regulating said feed pump in such a way that the conveying volume thereof is variable in selectable stages during an adjustable period of time.

7. A mechanism according to claim 5, in which said vacuum switch is connected to said conduit near said suction unit.

8. A mechanism according to claim 7, in which said vacuum switch is connected to said conduit in a region thereof disposed above an upper liquid level of said supply unit.

9. A mechanism according to claim 8, in which said supply unit is an automatic soaking unit that includes a mixer, with said vacuum switch being connected to said conduit in a region thereof disposed above an upper liquid level of said mixer.

10. A mechanism according to claim 2, in which said sensor is a measured-value indicator, the control signals of which are proportional to the vacuum prevailing in said conduit at any given time.

11. A mechanism according to claim 10, in which the conveying capacity of said feed pump is infinitely variable as a function of control signals emitted by said measured-value indicator

* * * * *